(12) United States Patent
Hullmann et al.

(10) Patent No.: US 7,874,775 B2
(45) Date of Patent: Jan. 25, 2011

(54) FASTENING DEVICE

(75) Inventors: Klaus Hullmann, Lorrach (DE);
Michael De Jong, Binzen (DE);
Thomas Eckert, Bad Sackingen (DE)

(73) Assignee: A. Raymond et Cie, Grenoble (FR)

( * ) Notice: Subject to any disclaimer, the term of this patent is extended or adjusted under 35 U.S.C. 154(b) by 200 days.

(21) Appl. No.: 12/295,901

(22) PCT Filed: Mar. 29, 2007

(86) PCT No.: PCT/EP2007/002784
§ 371 (c)(1),
(2), (4) Date: Oct. 3, 2008

(87) PCT Pub. No.: WO2007/124824
PCT Pub. Date: Nov. 8, 2007

(65) Prior Publication Data
US 2009/0169326 A1    Jul. 2, 2009

(30) Foreign Application Priority Data
Apr. 26, 2006  (DE) ................. 10 2006 019 256
Dec. 22, 2006  (DE) ................. 20 2006 019 411 U

(51) Int. Cl.
*F16B 37/02* (2006.01)
(52) U.S. Cl. ........................ 411/173; 24/295
(58) Field of Classification Search .......... 411/174, 411/175, 173, 520, 522–524; 24/293, 295
See application file for complete search history.

(56) References Cited

U.S. PATENT DOCUMENTS

| | | | | |
|---|---|---|---|---|
| 2,885,754 A * | 5/1959 | Munse | ......................... | 24/293 |
| 3,486,202 A * | 12/1969 | Nelson | ......................... | 24/292 |
| 4,300,865 A * | 11/1981 | Murray | ......................... | 411/15 |
| 4,610,588 A * | 9/1986 | Van Buren et al. | .......... | 411/173 |
| 5,919,019 A * | 7/1999 | Fischer | ....................... | 411/182 |
| 6,095,734 A * | 8/2000 | Postadan et al. | ............ | 411/182 |
| 6,691,380 B2 * | 2/2004 | Vassiliou | ...................... | 24/295 |
| 6,976,292 B2 * | 12/2005 | MacPherson et al. | ......... | 24/293 |

(Continued)

FOREIGN PATENT DOCUMENTS

DE    3524651  A1    2/1986

(Continued)

*Primary Examiner*—Gary Estremsky
(74) *Attorney, Agent, or Firm*—Baker & Daniels LLP

(57) ABSTRACT

A fastening device to be fitted into a support part (22) has a cover plate (1) and two clamping arms (6, 7). Each clamping arm (6, 7) has an inner leg (5) and an outer leg (10) which has a bracing structure on its end facing the cover plate (1). The bracing structure of each clamping arm (6) is provided with two flat side cheeks (15, 16) that are joined to mutually opposite side margins (13, 14) of the respective outer leg (10) and extend toward the other clamping arm (6, 7). Each side cheek (15, 16) has an end face (17) that is oriented at an angle to the cover plate (1) and falls away toward the respective outer leg (10) from the end remote from that outer leg (10). The fastening device according to the invention can consequently be used in the presence of relatively high extraction forces with support parts that vary in thickness over a relatively large range.

16 Claims, 6 Drawing Sheets

U.S. PATENT DOCUMENTS

| | | |
|---|---|---|
| 7,213,304 B2 * | 5/2007 | Lubera et al. ............... 24/295 |
| 7,226,260 B2 | 6/2007 | Jackson, Jr. et al. |
| 2003/0071475 A1 | 4/2003 | Abejon et al. |
| 2007/0223991 A1 | 9/2007 | Motsch et al. |
| 2008/0260490 A1 | 10/2008 | Motsch et al. |
| 2008/0286066 A1 | 11/2008 | Paquet |

FOREIGN PATENT DOCUMENTS

| | | |
|---|---|---|
| EP | 0930440 A1 | 7/1999 |
| EP | 1510702 A1 | 3/2005 |
| ES | 2163363 A1 | 1/2002 |

* cited by examiner

FASTENING DEVICE

CROSS-REFERENCE TO RELATED APPLICATION

This application is a U.S. National Phase patent application based on International Application Serial No. PCT/EP2007/002784 filed Mar. 29, 2007, the disclosure of which is hereby explicitly incorporated by reference herein.

BACKGROUND OF THE INVENTION

1. Field of the Invention

The present invention is directed to a fastening device.

2. Description of the Related Art

One known fastening device is disclosed in DE 35 24 651 A1. The prior fastening device for fastening an add-on part to a support part comprises a cover plate and two clamping arms disposed on mutually opposite sides of the cover plate. Each clamping arm has an inner leg, which is joined to the cover plate, and an outer leg, a flat tongue portion of a bracing structure being formed on the outer leg, on its end face proximate the cover plate. The tongue portion engages in a receiving opening configured in the inner leg and closely surrounding said tongue portion, it being provided that in the installed state, the tongue portions brace themselves against the back side of the support part, i.e., the opposite side from the add-on part, in substantially parallel alignment with the cover plate.

Although very high extraction forces are achieved with such a fastening device, it is disadvantageous that the fastening device has to be matched to the thickness of the support part within relatively close tolerances.

SUMMARY OF THE INVENTION

The present invention provides a fastening device that can be used in the presence of relatively high extraction forces with support parts that vary in thickness over a relatively large range.

Due to the fact that in the inventive device, the bracing structure comprises side cheeks formed on side margins of the outer leg and having beveled end faces, the clamping arms automatically adapt to the thickness of the particular support part by virtue of the side cheeks inserting themselves more or less deeply into the receiving opening.

In one form thereof, the present invention provides a fastening device to be fitted into a support part, and including a cover plate and two clamping arms joined to the cover plate on opposite marginal sides and disposed opposite each other on one side of the cover plate, each clamping arm including an inner leg proximate the other clamping arm and an outer leg that is remote from the other clamping arm and is connected by a tie portion to the end of the inner leg remote from the cover plate and includes a bracing structure at its end proximate the cover plate, the bracing structure of each clamping arm being configured with two flat side cheeks, which are joined to mutually opposite side margins of the respective outer leg and extend toward the other clamping arm, and each side cheek having an end face that is oriented at an angle to the cover plate and falls away toward the respective outer leg from the end remote from the outer leg, characterized in that configured in each inner leg is a receiving opening in which the side cheeks joined to the respective opposite outer leg engage.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
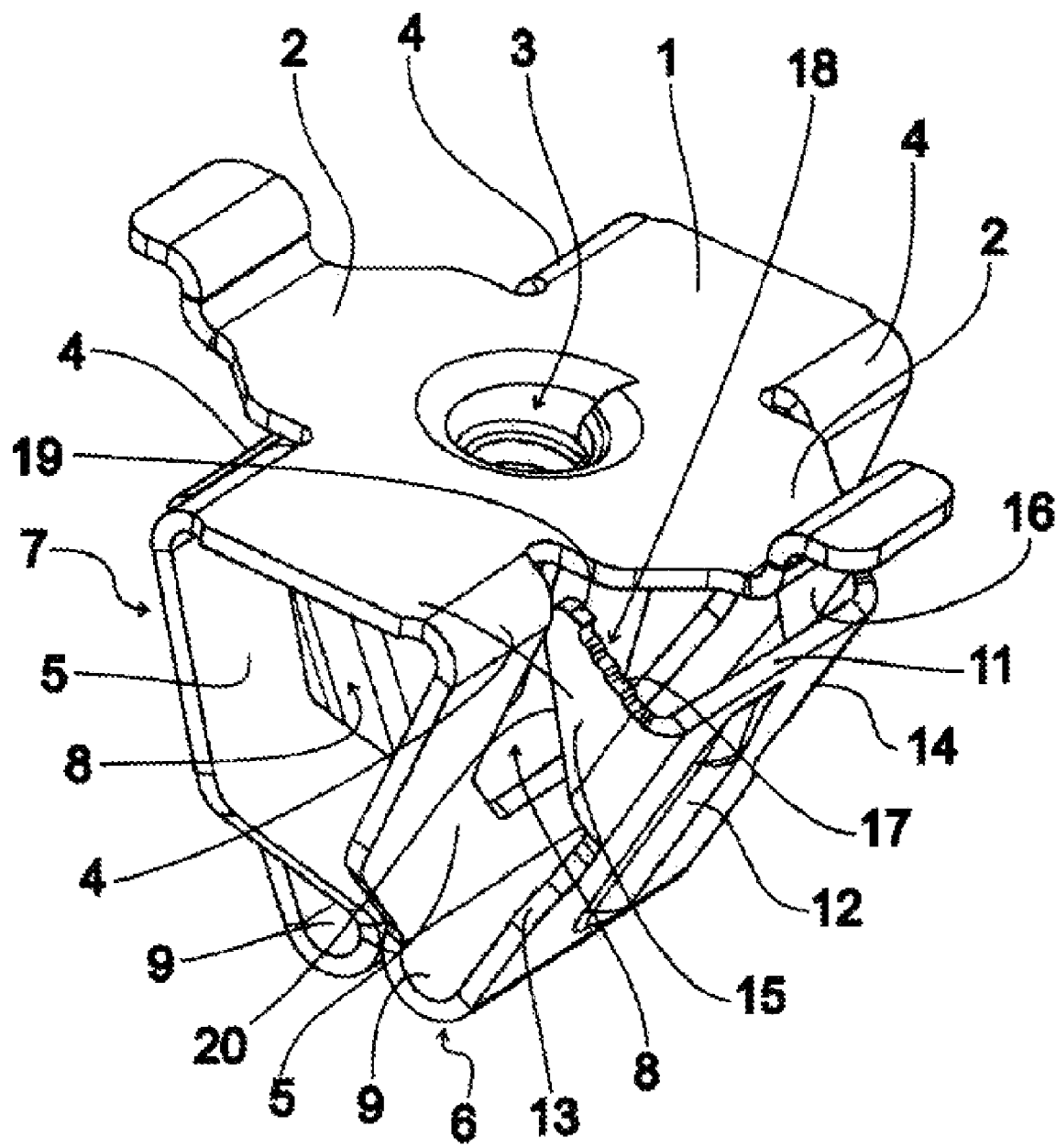
FIG. 1 is a perspective view of an exemplary embodiment of a fastening device according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a device according to the invention, which is made of stamped and bent sheet metal and is provided to be fitted into a support part not illustrated in FIG. 1, and which comprises a substantially rectangular cover plate 1. Joined to opposite long sides of the cover plate 1 are support tongues 2 that extend outwardly away from the cover plate 1 and in the exemplary embodiment according to FIG. 1 are each bent stepwise at their end remote from the cover plate 1.

Present in the center of the cover plate 1 is a thread structure 3, for example in the form of a stamped thread, into which a screw (not shown in FIG. 1) can be screwed in order to fasten an add-on part to the support part.

Configured on both sides of each support tongue 2 is a tie portion 4 by means of which an inner leg 5 of each clamping arm 6, 7 is joined to the cover plate 1. The inner legs 5 each have a receiving opening 8 in their regions adjacent cover plate 1, and extend toward each other on one respective side of the cover plate 1, in such a way that the ends of clamping arms 6, 7 remote from cover plate 1 preferably rest against or at least are closely adjacent to each other.

At the ends remote from cover plate 1, clamping arms 6, 7 each comprise a bent-back portion 9 that is bent back approximately 180 degrees and is joined to the respective inner leg 5, and onto each of which is further formed a respective outer leg 10. Each outer leg 10 extends from bent-back portion 9 approximately parallel to the inwardly opposite inner leg 5 toward the cover plate 1 and terminates by its end face 11 which is proximate the cover plate 1, and which is narrower than the width of the outer leg 10 in the region of transition to bent-back portion 9, at a distance from cover plate 1 that is greater than the thickness of the support part that can be used with the inventive fastening device. To increase the rigidity of the outer leg 10 and to reduce the mounting force of the inventive device according to FIG. 1, formed into each outer leg 10 is an outwardly convex swaged portion 12 that extends in the longitudinal direction of said outer leg 10.

Formed at the side margins 13, 14 of the outer legs 10 are wing-like side cheeks 15, 16, which abut the respective end face 11 and are bent back, from an arrangement originally in the plane of the outer leg 10, substantially at right angles in the direction of the opposite clamping arm 6, 7, and which are disposed opposite each other in pairs. The length by which each side cheek 15, 16 protrudes beyond the respective outer leg 10 is smaller than or at most equal to the distance between the inner legs 5 in the region of side cheeks 15, 16, such that the outer legs 10 are able to deflect until contact is made with the inner legs 5. In the exemplary embodiment according to FIG. 1, each side cheek 15, 16 engages in the receiving opening 8 of the respective inner leg 5.

It can further be seen from FIG. 1 that the side cheeks 15, 16 are configured on their end faces 17 proximate the cover plate 1 with a step structure 18 composed of elevations and depressions. Present as a terminating elevation at the end of each side cheek 15, 16 directed away from the respective outer leg 10 is a blocking shoulder 19 that rises from the end face 17 in the direction of cover plate 1. A slanted back side 20 extends from the end of each side cheek 15, 16 remote from said outer leg 10 toward the respective outer leg 10, with the result that the dimension of each side cheek 15, 16 in the longitudinal direction decreases continuously from outer leg 10 to the end remote from outer leg 10.

Figure 2:
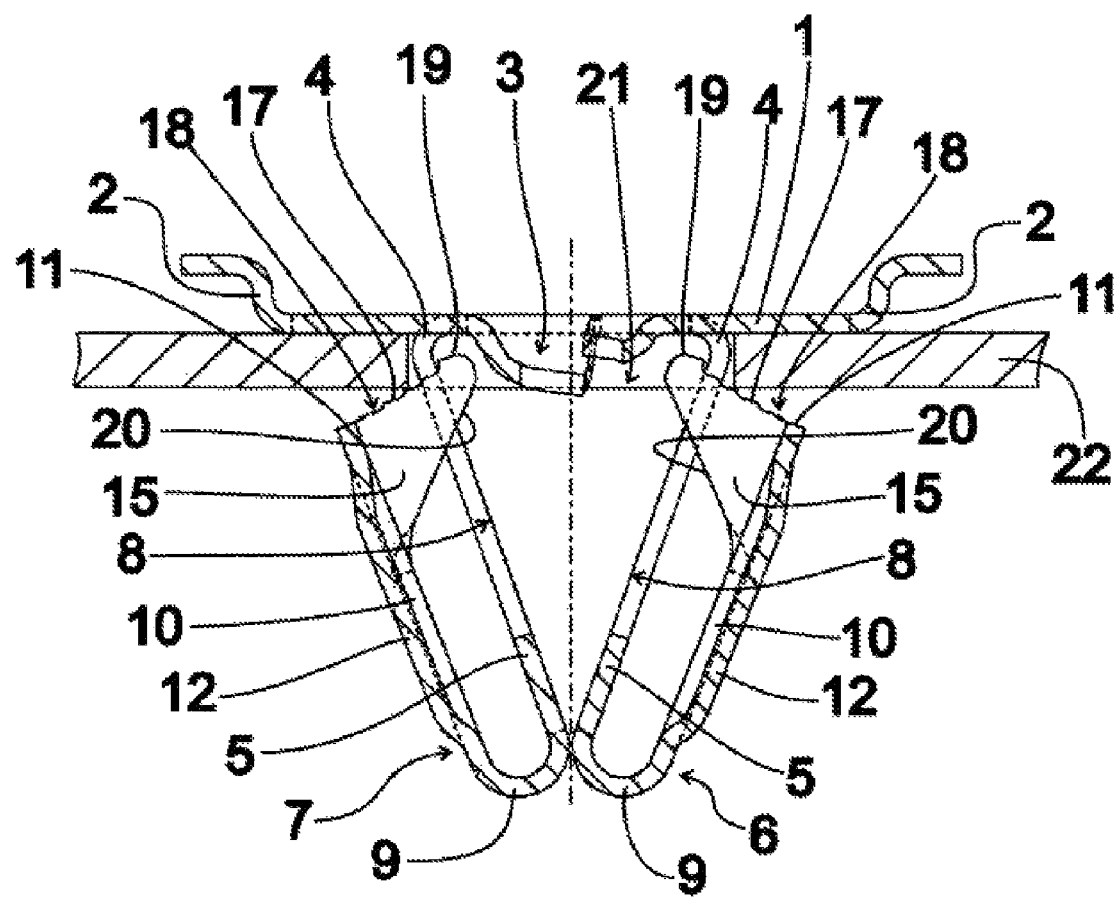
FIG. 2 is a sectional view of the exemplary embodiment according to FIG. 1 in an installed state.

FIG. 2 is a sectional view of the exemplary embodiment according to FIG. 1 in an installed state in a support part 22 configured with an insertion opening 21. It can be seen from FIG. 2 that once the clamping arms 6, 7 have been guided through the insertion opening 21, the outer legs 10 are caused to spring outward until the end faces 17 of side cheeks 15, 16 rest against the rim of the insertion opening 21, the degree to which said outer legs 10 spring outward depending on the thickness of the particular support part 22. The step structures 18, by digging into the rim of the insertion opening 21, serve to keep the outer legs 10 from inadvertently being pressed in toward the inner legs 5 when a screw is screwed in and the ends of clamping arms 6, 7 remote from cover plate 1 spread apart, while the blocking shoulders 19 prevent the outer legs 10 from springing outward all the way, down to a given minimum thickness of support part 22.

Figure 3:
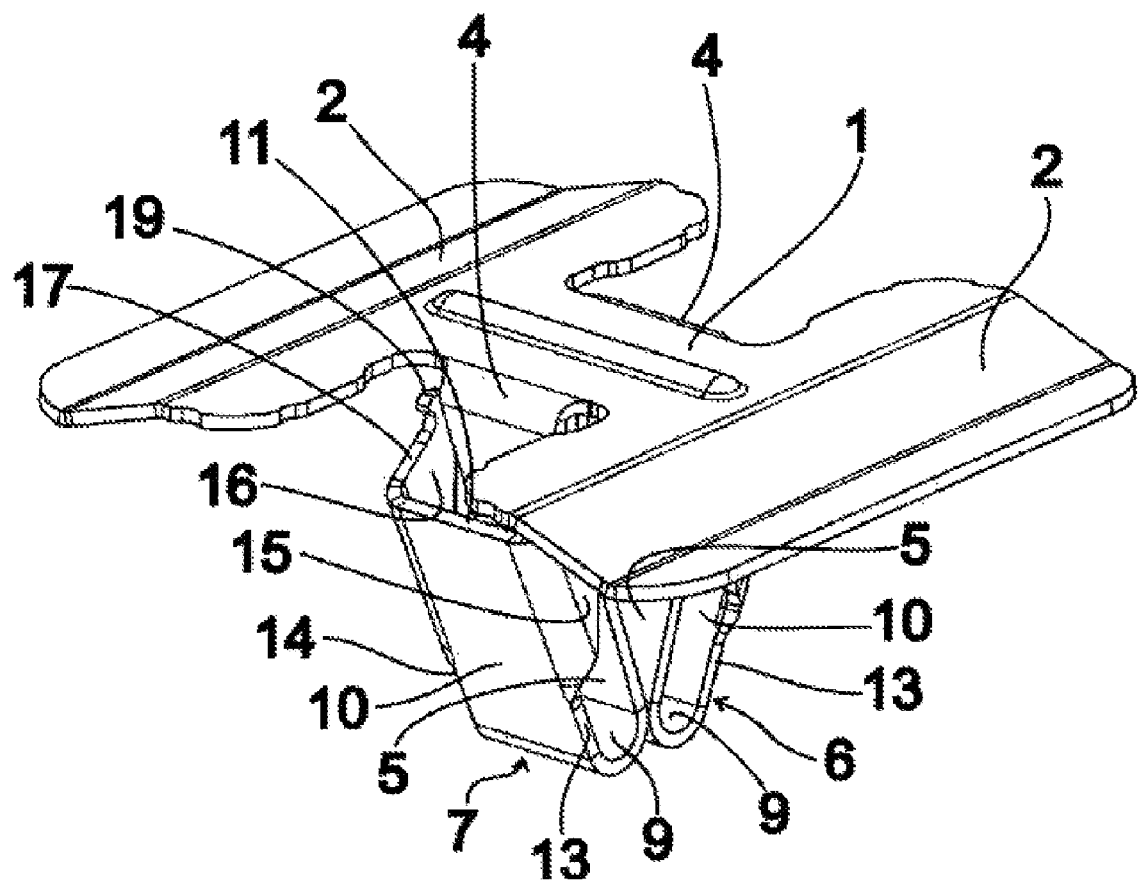
FIG. 3 is a perspective view of another exemplary embodiment of a device according to the invention.

FIG. 3 is a perspective view of another exemplary embodiment of a device according to the invention, it being noted that elements that are at least functionally similar in the exemplary embodiments according to FIGS. 1 and 2 and FIG. 3 are provided with the same reference characters and are not described in more detail below. It can be seen from FIG. 3 that in this exemplary embodiment, the widths of the inner legs 5 and the outer legs 10 are substantially the same, such that the inner legs 5 are disposed between the side cheeks 15, 16.

Figure 4:
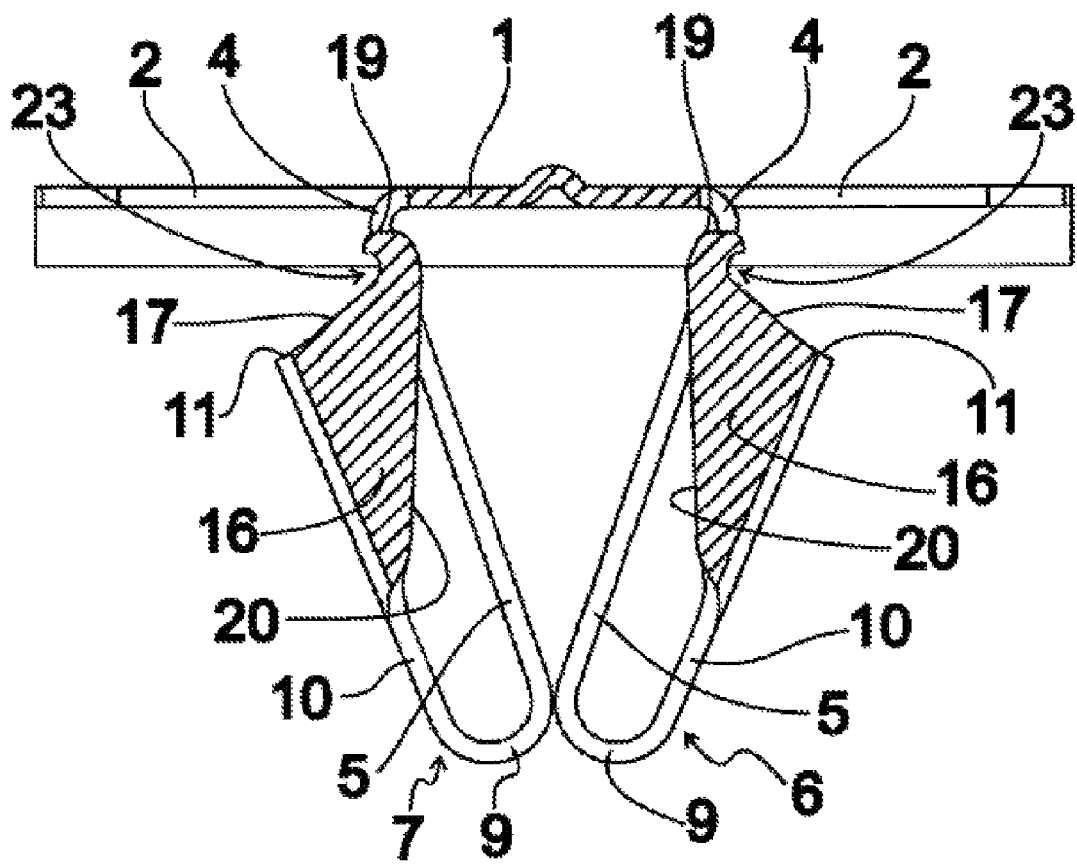
FIG. 4 is a sectional view of the exemplary embodiment according to FIG. 3.

FIG. 4 shows the exemplary embodiment according to FIG. 3 in a sectional view in the longitudinal direction. It can be appreciated from FIG. 4 that in this exemplary embodiment the end faces 17 of side cheeks 15, 16 are configured as smooth-surfaced, whereas the blocking shoulders 19 are each configured with, as a depression, a respective tool application recess 23 that is open toward the outer leg 10.

The exemplary embodiment according to FIGS. 3 and 4, which is configured without a thread structure for receiving a screw, is inserted in an insertion opening of a support part, the clamping action being achieved solely by the springing outward of outer legs 10. By the insertion of a detaching tool (not shown in FIGS. 3 and 4) in the tool application recesses 23, the outer legs 10 can be moved toward the inner legs 5 until the end faces 11 of the outer legs 10 are within the rim of the insertion opening and the inventive device can thus be withdrawn again from the support part. This demountability is furthered by the smooth-surfaced end faces 17 of the side cheeks 15, 16, since there is no pronounced digging into the margin of the insertion opening.

Figure 5:
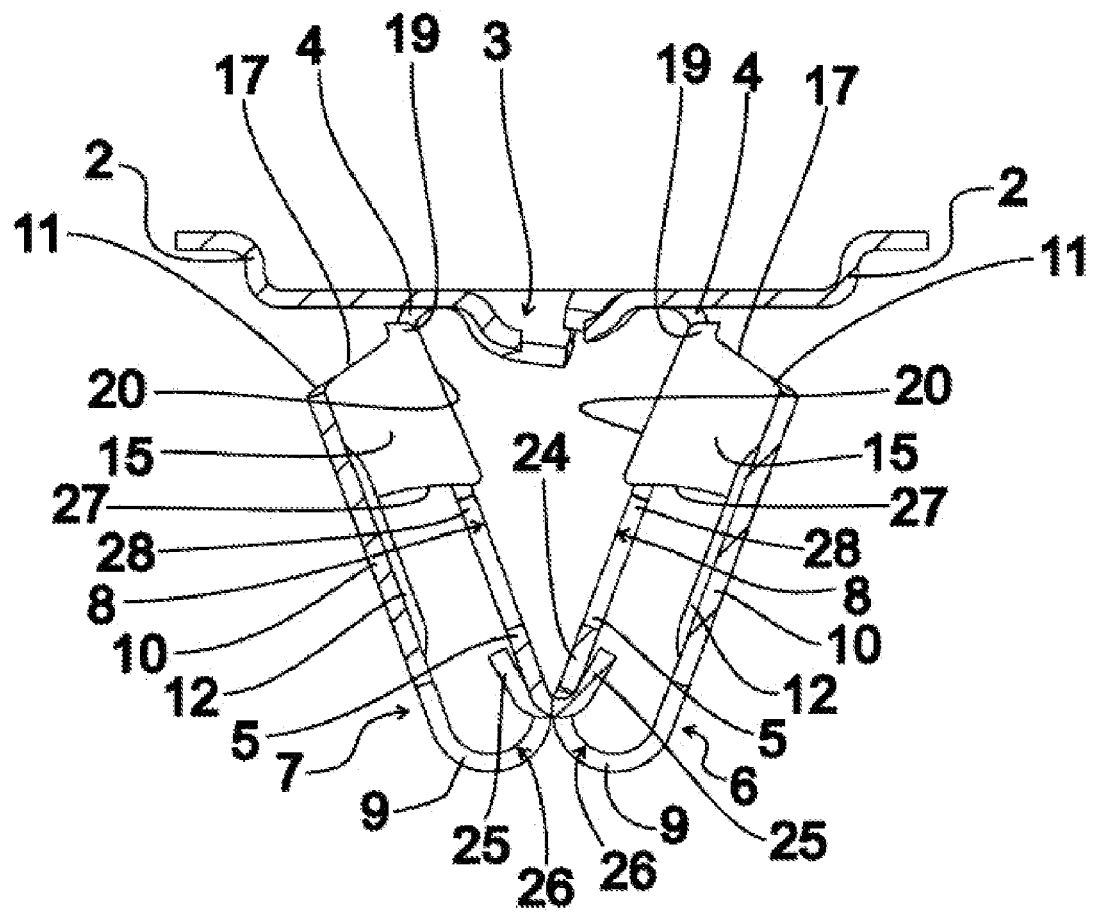
FIG. 5 is a sectional view of another exemplary embodiment of a fastening device according to the invention, with clamping arms locked together at their free ends.

FIG. 5 is a sectional view in the longitudinal direction of another exemplary embodiment of a device according to the invention, it being noted that elements that are similar in the exemplary embodiments according to FIGS. 1 to 4 and FIG. 5 are provided with the same reference characters and are not described in more detail below. In the exemplary embodiment according to FIG. 5, configured on each inner leg 5 in the region of the respective tie portion 9 are a rear-engagement web 24 that extends in the transverse direction and a rear-engagement tongue 25 which is bent back toward the cover plate 1 and extends toward the other inner leg 5, and which penetratingly engages in a penetrating-engagement opening 26 provided in the tie portion 9 of the other clamping arm 6, 7 and engages behind the rear-engagement web 24 of the other inner leg 5. The clamping arms 6 are thus locked together at their ends remote from the cover plate 1 to prevent them from spreading apart, which is advantageous particularly in the case of one-sided loading, to prevent a clamping arm 6, 7 from bending away under a one-sided load.

It can further be appreciated from FIG. 5 that configured on side cheeks 15, 16, on the sides remote from cover plate 1, are back sides 27 oriented preferably approximately at right angles to the longitudinal direction of the clamping arms 6, 7 and disposed opposite bracing projections 28, illustrated by their marginal edges in FIG. 5, which enter into the receiving openings 8. The fastening device according to the exemplary embodiment of FIG. 5 is thereby stabilized against a tensile load, since the back sides 27 brace themselves against the bracing projections 28 when a tensile load is applied.

Figure 6:
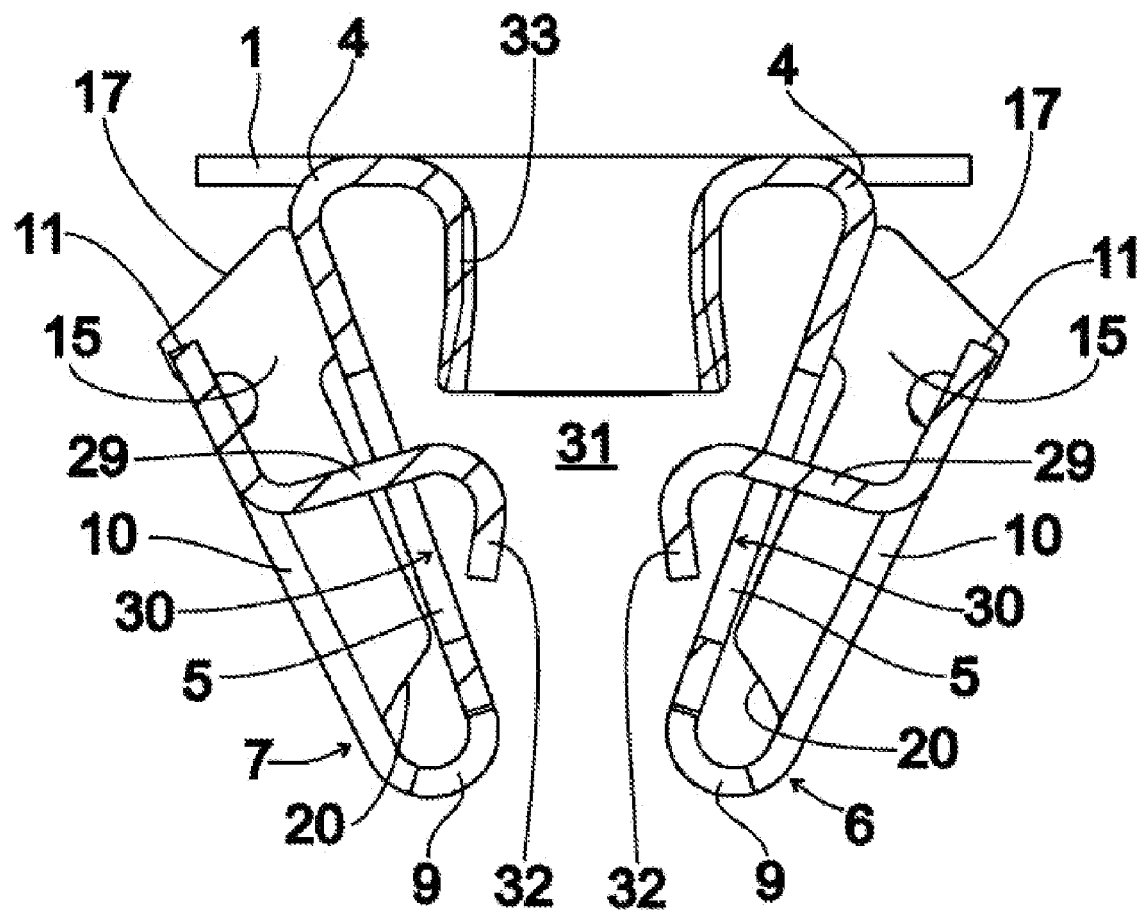
FIG. 6 is a sectional view of another exemplary embodiment of a fastening device according to the invention, with expansion tongues extending into a screw receiving space configured between clamping arms.

FIG. 6 is a sectional view in the longitudinal direction of another exemplary embodiment of a device according to the invention, it being noted that elements that are similar in the exemplary embodiments according to FIGS. 1 to 5 and FIG. 6 are provided with the same reference characters and are not described in more detail below. In the exemplary embodiment according to FIG. 6, formed on the outer leg 10 of each clamping arm 6, 7 is an expansion tongue 29 which extends toward the other clamping arm 6, 7, and which engages through a clearance 30 provided in the opposite inner leg 9 and enters into a screw receiving space 31 configured between the clamping arms 6, 7. Each expansion tongue 29 is bent back, by a flat end portion 32 located at its free end remote from the respective outer leg 10, toward bent-back portions 9, said end portions 32 being oriented roughly parallel to each other and being disposed spacedly opposite each other in the center of screw receiving space 31, considered in the longitudinal direction.

In the exemplary embodiment according to FIG. 6, formed on cover plate 1 is a threaded bushing 33 having a fine internal thread and projecting into screw receiving space 31, and into which can be screwed a screw (not shown in FIG. 6) having a fine external thread that mates with the fine internal thread. Due to the fact of end portions 32 being arranged roughly in the center of screw receiving space 31, the clamping arms 6, 7 come to be locked in place at a very early stage, initially as a result of the spreading of the outer legs 10 and also by means of the bent-back portions 9 of inner legs 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening device to be fitted into a support part, said fastening device comprising:
   a cover plate; and
   a pair of clamping arms joined to said cover plate on opposite marginal sides of said cover plate and disposed opposite each other, each said clamping arm including an inner leg proximate the other respective said clamping arm, and an outer leg disposed remote from the other respective said clamping arm and connected by a tie portion to an end of said inner leg remote from said cover plate, said outer legs each further including a bracing structure at an end thereof proximate said cover plate, said bracing structure including a pair of flat side cheeks joined to mutually opposite side margins of a respective said outer leg and extending toward the other said clamping arm, and each said inner leg including a receiving opening, said side cheeks respectively engagable within said receiving openings and further comprising, on sides of said side cheeks remote from said cover plate, back sides oriented approximately at right angles to a longitudinal direction of said clamping arms and disposed opposite bracing projections that enter into said receiving openings.

2. The fastening device of claim 1, wherein a length by which said side cheeks protrude beyond said outer legs is one of smaller than, and equal to, a distance between said inner legs in a region of said side cheeks.

3. The fastening device of claim 1, further comprising a thread structure configured on said cover plate, and a step structure including elevations and depressions formed on each said end face of each said side cheek.

4. The fastening device of claim 1, further comprising a terminating elevation extending toward said cover plate and configured on an end of each said side cheek remote from a respective said outer leg.

5. The fastening device of claim 1, wherein a distance between two said side cheeks joined to a said outer leg is greater than a width of the respective said inner leg disposed opposite said outer leg.

6. The fastening device of claim 1, further comprising, on each said inner leg in a region of a respective tie portion, a rear-engagement web extending in a transverse direction and a rear-engagement tongue extending toward the other said inner leg and engaging behind the said rear-engagement web of said other inner leg, such that said clamping arms are locked together at their ends remote from said cover plate to prevent them from spreading apart.

7. The fastening device of claim 1, further comprising, on each said outer leg, an expansion tongue extending toward the other said outer leg and engaging through a clearance provided in the said inner leg disposed opposite the respective said outer leg.

8. The fastening device of claim 7, further comprising a flat end portion configured at the free end of each said expansion tongue, said end portions disposed spacedly opposite and approximately parallel to each other.

9. A fastening device to be fitted into a support part, said fastening device comprising:
   a cover plate; and
   a pair of clamping arms joined to said cover plate on opposite marginal sides of said cover plate and disposed opposite each other, each said clamping arm including a first leg and a second leg connected by a tie portion at ends of said first and second legs disposed remote from said cover plate;
   said first legs each including a bracing structure spaced from said tie portion, said bracing structures each including a pair of flat side cheeks extending from said first legs, each said side cheek including, on a side thereof remote from said cover plate, a back side oriented approximately at a right angle to a longitudinal direction of said clamping arms; and
   said second legs including receiving openings into which said side cheeks extend, said receiving openings including bracing projections against which said back sides of said side cheeks are engageable.

10. The fastening device of claim 9, wherein each of said side cheeks further includes a terminating elevation extending toward said cover plate.

11. The fastening device of claim 9, wherein said cover plate includes support tongues extending outwardly from said cover plate.

12. The fastening device of claim 9, wherein said first legs include outwardly convex swaged portions.

13. A fastening device to be fitted into a support part, said fastening device comprising:
   a cover plate; and
   a pair of clamping arms joined to said cover plate on opposite marginal sides of said cover plate and disposed opposite each other, each said clamping arm including a first leg and a second leg connected by a tie portion at ends of said first and second legs disposed remote from said cover plate;
   said first legs each including a bracing structure spaced from said tie portion, said bracing structures each including a pair of flat side cheeks extending from said first legs, each said side cheek including, on a side thereof remote from said cover plate, a back side oriented approximately at a right angle to a longitudinal direction of said clamping arms;
   said second legs including receiving openings into which said side cheeks extend; and
   means operable between said first and second legs for bracing said side cheeks responsive to a tensile load exerted upon said clamping arms.

14. The fastening device of claim 13, wherein each of said side cheeks further includes a terminating elevation extending toward said cover plate.

15. The fastening device of claim 13, wherein said cover plate includes support tongues extending outwardly from said cover plate.

16. The fastening device of claim 13, wherein said first legs include outwardly convex swaged portions.

* * * * *